PROCESS FOR PURIFYING GASES CONTAINING SULPHUR COMPOUNDS AND RECOVERING ELEMENTAL SULPHUR

Philippe Renault, Noisy-le-Roi, Andre Deschamps, Chatou, and Claude Dezael, Maisons-Laffitte, France, assignors to Institut Francais du Petrole, des Carburants et Lubrifiants
No Drawing. Filed Jan. 24, 1972, Ser. No. 220,403
Claims priority, application France, Jan. 29, 1971, 7103181
Int. Cl. C01b 17/04
U.S. Cl. 423—575                                    20 Claims

ABSTRACT OF THE DISCLOSURE

Process for purifying a gas stream containing sulphur compounds such as COS and $CS_2$ in which said stream is passed, together with steam, at 250–400° C., over an alumina containing catalyst so as to produce $H_2S$, a portion of the produced $H_2S$ is oxidized to $SO_2$ at 300–500° C., so as to obtain a ratio $H_2S/SO_2$ from 1.6 to 3, and said $SO_2$ is reacted with the remaining portion of $H_2S$ at 20–160° C., so as to produce elemental sulphur.

---

This invention relates to an improved process for purifying gas streams containing sulphur compounds such as COS and $CS_2$ and recovering elemental sulphur therefrom.

The gas streams flowing out from plants of the Claus type contain, even after several catalytic treatments, significant amounts of $H_2S$ and $SO_2$ and sometimes organic sulphur compounds such as COS and $CS_2$.

Generally they contain from 0.01% to 4% (e.g. from 0.1 to 4%) by volume of sulphur compounds, from 5 to 60% (e.g. from 10 to 40%) of steam and in some cases a small amount of hydrogen, e.g. 0.1 to 3%. In the literature, e.g., U.S. Pats. 3,441,379 and 3,598,529, there is described the conversion of hydrogen sulphide and sulphurous anhydride to sulphur in the presence of a solvent according to the following reaction:

$$2H_2S + SO_2 \rightarrow 3S + 2H_2O$$

Under these conditions, the organic sulphur compounds do not undergo a sufficient conversion to provide an effluent entirely free from sulphur. It is an object of this invention to improve the final purification by converting the organic sulphur compounds to hydrogen sulphide and by restoring a ratio of the hydrogen sulphide to the sulphurous anhydride ($SO_2$) of from 1.6 to 3 and preferably from 1.8 to 2.4.

The contemplated process consists of purifying the gas effluents containing from 0.01 to 4% (preferably from 0.1 to 4%) by volume of sulphur compounds such as COS and $CS_2$ and from 5 to 60% (preferably from 10 to 40%) of steam, with optionally from 0.1 to 3% of hydrogen and in some cases $H_2S$ and /or $SO_2$. According to this process, in a first reaction zone, a gas containing COS and/or $CS_2$ and steam is caused to pass, at a temperature from 250° C. to 400° C., over an alumina containing catalyst.

In a second reaction zone, a portion of the hydrogen sulphide produced in the preceding step is oxidized to sulphurous anhydride so as to obtain a ratio of the hydrogen sulphide to the sulphurous anhydride of from 1.6 to 3, preferably from 1.8 to 2.4 and particularly from 1.9 to 2.2. This operation is conducted at a temperature of 300 to 500° C. while adding oxygen to the outflow from the first reaction zone, said oxygen being used as such or as an oxygen-containing gas in an amount of, for example, from 0.1 to 5% of the total reaction volume; then, in a third reaction zone, hydrogen sulphide is reacted with sulphurous anhydride at a temperature from 20 to 160° C. (preferably from 115 to 160° C.) in the presence of an organic solvent and elemental sulphur is recovered at the outlet of the third zone.

This process may be used more particularly for the treatment of the gas effluents from Claus units generally containing (by volume): from 0.1 to 3% of hydrogen sulphide and sulphurous anhydride in a ratio of hydrogen sulphide to sulphurous anhydride close to 2, from 0.01 to 0.3% of COS, from 0.01 to 3% of $CS_2$, elemental sulphur and other components consisting mainly of nitrogen, steam and carbon dioxide.

The outflow from a unit of the Claus type may also be treated by an inert organic solvent, as described in U.S. Pat. 3,598,529. The product of this treatment contains only very small amounts of $H_2S$ and $SO_2$, but it still contains such compounds as COS and $CS_2$ which are converted only to a minor extent by said treatment. The treatment of this invention is to be applied to such an outflow.

In the first reaction zone, according to the present invention, there is achieved the conversion to hydrogen sulphide of the sulphur organic compounds ($CS_2$, COS) contained in the gas effluent, at a temperature of, for example, from 250 to 400° C., preferably from 300 to 350° C., over an alumina containing catalyst having preferably an alkali metal content lower than 0.1%, a specific surface from 40 to 500 m.$^2$/g., more preferably from 180 to 350 m$^2$./g., and a pore volume from 10 to 80 cc./100 g. and more preferably from 30 to 60 cc./100 g. This alumina may be used alone but it is advantageous in some cases, to deposit on the alumina one or more metals selected from the metals of Groups VI–A and VIII of the periodic classification of elements as published by Societé Chimique de France, and more particularly selected from the group consisting of molybdenum, tungsten and the metals pertaining to the iron group (iron, nickel and cobalt). In this latter case the content of metals from Groups VI–A and VIII is preferably from 1 to 20% by weight, expressed as oxide.

The catalyst containing metals from Groups VI–A and VIII is preferably used in the sulphurized form. As examples of associations of metals from Groups VI–A and VIII, there can be mentioned: cobalt-molybdenum, cobalt-tungsten, nickel-molybdenum and nickel-tungsten.

Although the pressure may be selected within a wide range, the operating pressure, in the first reaction zone, may be close to the atmospheric pressure, for example from 1.05 to 2 absolute atmospheres. The space velocity (V.V.H.=volume of gas introduced per hour divided by the volume of the catalyst) depends on the content of sulphur compounds in the treated effluent; it is generally from 500 to 5000.

The gas outflow from the first stage no longer contains substantial amounts of sulphur organic compounds.

This outflow is then conveyed to a second reaction zone in which there is achieved a controlled oxidation by oxygen of a portion of the hydrogen sulphide in the gas stream. The oxidation is conducted according to the reaction mechanism:

$$H_2S + \frac{3}{2} O_2 \longrightarrow SO_2 + H_2O$$

For this purpose, an oxygen-containing gas is admixed to the effluent. The oxidation of the hydrogen sulphide is conducted at a temperature for example from 300 to 500° C. and preferably from 350 to 400° C. The oxygen flow rate depends on the content in $H_2S$ and other combustible compounds, for example CO or $H_2$, of the gas. In most of the cases, it amounts to 0.1 to 5% of the gas flow issued from the first reaction zone and it is such that, in the outflow from the second zone, the molar ratio hydrogen sulphide/sulfurous anhydride be from 1.6 to 3, preferably from 1.8 to 2.4, for example from 1.9 to 2.2. It has been discovered, and this is one of the objects of the invention, that the best purification yields are achieved when the ratio $H_2S/SO_2$ is within these ranges.

In this second reaction zone, the operating pressure will be preferably from 1.05 to 2 absolute atmospheres, these values being however not limitative.

It may be advantageous to carry out the oxidation in the presence of an oxidation catalyst; this catalyst may, for example, comprise alumina in which one or more metals from Groups V-A, VI-A and VIII of the periodic classification, more particularly selected from chromium, vanadium and iron, are present as oxides, for example in an amount of 1 to 20% by weight.

As examples of metal combination, there can be mentioned: iron-chromium and vanadium-iron.

The oxygen amount at the inlet will be preferably so selected that the outflow from the second reaction zone have a maximum oxygen, content of 700 p.p.m.

The outflow from the second zone, in which the ratio $H_2S/SO_2$ is close to 2, is conveyed to a third reaction zone where the gas is contacted at a temperature of, for example, from 20 to 160° C. and preferably from 115 to 160° C., with an organic solvent stable at the contact temperature. This solvent preferably contains a catalyst favoring the reaction between $H_2S$ and $SO_2$. A very wide range of solvents can be used in this reaction zone; there can be mentioned particularly sulfolane, the heavy alcohols having for example from 12 to 20 carbon atoms and more generally the organic liquids which are inert with respect to the treated gas. The presence of water in small amount is favorable. It is however preferred to make use of solvents of the two following types:

the triesters of orthophosphoric acid such as, for example, tri - butyl - phosphate, tri - n - propyl - phosphate, tri-isobutyl - phosphate, tri - phenyl - phosphate and tri- cyclo - hexyl - phosphate;

the alkylene-glycols, the poly-alkylene-glycols, the ethers, esters and ether-esters of alkylene-glycols, the ethers, esters, ether-esters of poly-alkylene-glycols, particularly ethylene - glycol, tri - ethylene - glycol, dipropylene- glycol, tetra - butylene - glycol, deca - ethylene - glycol mono - ethyl - ether and poly - ethylene - glycol having a molecular weight of about 400.

The catalyst, which is advantageously added, is preferably selected among the alkali metal compounds and more particularly among the salts formed between the metals of Groups I and II, left column (Groups I-A and II-A) of the periodic classification and the organic carboxylic acids or partial esters thereof.

The applicant has described such catalysts in the French Pat. No. 1592092 and in U.S. Pat. No. 3,598,529. By way of example of the preferred compounds which can be used according to the invention, there can be mentioned potassium benzoate, sodium benzoate, potassium salicylate, the sodium and potassium salts of nicotinic acid, cinnamic acid and furoic acid, potassium adipate, acid or neutral potassium phthalates.

When using an organic polyvalent acid for preparing the salt, it is advantageous to partially esterify it before salifying it with an alkali metal or alkaline earth hydroxide, by means of an alcohol compound used as solvent. The applicant has described such catalysts in the French patent application No. PV 7043077 filed on Nov. 30, 1970. Other catalysts which can be used are for example, ammonia, amines, alkanolamines, alkali metal or alkaline earth hydroxides and the alkali metal salts of weak inorganic acids. The reaction medium generally contains from 0.05 to 5% by weight of catalyst and preferably from 0.1 to 2%.

The following examples are given for illustrating the invention.

EXAMPLE 1

10,000 $Nm^3/h$. ($Nm^3/h$. indicates that the volume is measured under normal conditions of temperature and pressure) of an outflow from a Claus unit and whose composition expressed by volume is as follows:

$H_2S = 0.75\%$   $H_2O = 30\%$
$SO_2 = 0.37\%$   $H_2 = 1\%$
$COS = 0.19\%$   $CO_2 = 2.50\%$
$CS_2 = 0.05\%$   $N_2 = 65.14\%$ are passed, at a temperature of 300° C. and under a pressure of 1.25 absolute atmospheres, over 10 $m^3$ of an alumina containing less than 0.1% of $Na_2O$ and having a specific surface of 277 $m^2/g$.

The analysis of the sulphur compounds of the so-treated outflow is as follows by volume:

$H_2S = 1.05\%$   $COS = 0.01\%$
$SO_2 = 0.35\%$   $CS_2 = 0\%$

This effluent is partially oxidized at 400° C. under a pressure of 1.15 absolute atmospheres by addition of 750 $m^3/h$. of air in the presence of an alumina having a specific surface of 277 $m^2/g$. on which 10% by weight of $V_2O_5$ are deposited.

The analysis of the acid gas from the produced effluent shows that the acid gas content is by volume as follows:

$H_2S = 0.93\%$; $SO_2 = 0.455\%$.

This effluent is conveyed to a third reaction zone in which it is contacted at 130° C., under a pressure of 1.05 atmospheres, with a polyethylene-glycol having a mean molecular weight of 400 and containing 6.4 g. of potassium benzoate per kg. of solvent. The outflow from said zone then contains no more than 1,400 p.p.m. of acid gas $H_2S$ and $SO_2$, which corresponds, after a conventional incineration, to about 1000 p.p.m. of $SO_2$.

EXAMPLE 2

(Given for comparison purpose)

10,000 $Nm^3/h$. of the outflow from a Claus unit with the following composition by volume:

$H_2S = 0.75\%$   $H_2O = 30\%$
$SO_2 = 0.37\%$   $H_2 = 1\%$
$COS = 0.19\%$   $CO_2 = 2.50\%$
$CS_2 = 0.05\%$   $N_2 = 65.14\%$ are directly contacted, at 130° C., under a pressure of 1.05 atmospheres, with a polyethylene-glycol having a mean molecular weight of 400 and containing 6.4 g. per kg. of potassium benzoate.

The outflow then contains no more than 1,200 p.p.m. of acid gases ($H_2S+SO_2$). After incineration, as a result of the sulphur organic compounds present (which have not been converted) the $SO_2$ content of the gas amounts to about 3,800 p.p.m.

EXAMPLE 3

(Given for comparison purpose)

10,000 $Nm^3/h$. of the outflow from a Claus unit with the following composition by volume:

$H_2S = 0.75\%$   $H_2O = 30\%$
$SO_2 = 0.37\%$   $H_2 = 1\%$
$COS = 0.19\%$   $CO_2 = 2.50\%$
$CS_2 = 0.05\%$   $N_2 = 65.14\%$ are passed, at 300° C., under a pressure of 1.25 absolute atmospheres, over 10 $m^3$. of an alumina having a $Na_2O$ content lower than 0.1% and a specific surface of 277 $m^2/g$.

The content of sulphur compounds of the so-treated outflow, as determined by analysis, is the following:

$H_2S = 1.05\%$
$SO_2 = 0.35\%$
$COS = 0.01\%$
$CS_2 = 0\%$

This outflow is then contacted, at 130° C., under a pressure of 1.05 atmospheres, with a polyethylene-glycol having a mean molecular weight of 400 and containing 6.4 g. per kg. of potassium benzoate. The outflow then contains no more than 3,700 p.p.m. of acid gases. After incineration, the $SO_2$ content of the gas amounts to about 3,400 p.p.m.

EXAMPLE 4

(Given for comparison purpose)

18,000 Nm³/h. of the outflow from a Claus unit with the following composition by volume:

| | |
|---|---|
| $H_2S = 0.90\%$ | $CO_2 = 12.00\%$ |
| $SO_2 = 0.48\%$ | $H_2O = 29.00\%$ |
| $COS = 0.15\%$ | $N_2 = 55.97\%$ |
| $H_2 = 1.50\%$ | | are passed, at 300° C., under a pressure of 1.25 absolute atmospheres, over 10 m.³ of an alumina containing less than 0.1% of $Na_2O$ and having a specific surface of 277 m.²/g.

The content of sulphur compounds of the so-treated outflow as determined by analysis, is the following:

$H_2S = 1.09\%$; $SO_2 = 0.44\%$; $COS = 0.01\%$ which corresponds to a molar ratio:

$$\frac{H_2S}{SO_2} = 2.48$$

This outflow is then contacted, at 130° C., under a pressure of 1.05 absolute atmospheres, with polyethylene-glycol having a mean molecular weight of 400 and containing 10 grams per kg. of di-potassium phthalate. The outflow then contains 3,000 p.p.m. of $H_2S$ and only 450 p.p.m. of $SO_2$.

EXAMPLE 5

18,000 Nm³/h. of an outflow from a Claus unit with the following composition by volume, as determined by analysis:

| | |
|---|---|
| $H_2S = 0.90\%$ | $CO_2 = 12.00\%$ |
| $SO_2 = 0.48\%$ | $H_2O = 29.00\%$ |
| $COS = 0.15\%$ | $N_2 = 55.97\%$ |
| $H_2 = 1.50\%$ | | are passed, at 300° C., under a pressure of 1.25 absolute atmospheres, over 10 m.³ of an alumina containing less than 0.1% of $Na_2O$ and having a specific surface of 277 m.²/g.

The sulphur compounds content by volume of the so-treated outflow, as determined by analysis, is the following:

$H_2S = 1.09\%$; $SO_2 = 0.44\%$; $COS = 0.01\%$ which corresponds to a molar ratio $$\frac{H_2S}{SO_2} = 2.48$$

This outflow is partially oxidized under the same conditions as those indicated in example 1 (pressure: 1.15 absolute atmospheres, 750 m.³/h. of air and the same catalyst). The following content in acid gases of the resulting outflow has been determined by analysis:

$H_2S = 1.02\%$; $SO_2 = 0.51\%$ which corresponds to a molar ratio:

$$\frac{H_2S}{SO_2} = 2$$

The outflow is then contacted, at 130° C., under a pressure of 1.05 atmospheres with polyethylene-glycol having a mean molecular weight of 400 and containing 10 grams of di-potassium phthalate per kg. of solvent.

The outflow then contains no more than 2,000 p.p.m. of $H_2S$ and 1,000 p.p.m. of $SO_2$.

EXAMPLE 6

(Given for comparison purpose)

18,000 Nm³/h. of an outflow from a Claus unit having the following composition by volume:

| | |
|---|---|
| $H_2S = 0.90\%$ | $CO_2 = 12.00\%$ |
| $SO_2 = 0.48\%$ | $H_2O = 29.00\%$ |
| $COS = 0.15\%$ | $N_2 = 55.97\%$ |
| $H_2 = 1.50\%$ | | are passed, at 300° C., under a pressure of 1.25 absolute atmospheres, over 10 m.³ of an alumina containing less than 0.1% of $Na_2O$ and having a specific surface of 277 m.²/g.

The analysis of the sulphur compounds contained in the effluent has given the following results, by volume:

$H_2S = 1.09\%$; $SO_2 = 0.44\%$; $COS = 0.01\%$ which corresponds to a molar ratio:

$$\frac{H_2S}{SO_2} = 2.48$$

This outflow is partially oxidized under the same conditions as those indicated in example 1 but with the addition of a slightly greater amount of air.

The analysis of the acid gases contained in the effluent gives the following results:

$H_2S = 0.92\%$; $SO_2 = 0.61\%$ which corresponds to a molar ratio:

$$\frac{H_2S}{SO_2} = 1.5$$

This effluent is then contacted, at 130° C., under a pressure of 1.05 atm., with polyethylene-glycol having a mean molecular weight of 400 and containing 10 g. of dipotassium phthalate per kg. of solvent. The effluent then contains 1,800 p.p.m. of $H_2S$ and 2,400 p.p.m. of $SO_2$, which is an indication that it is not advantageous to proceed with a ratio $H_2S/SO_2$ much different from the preferred one.

EXAMPLE 7

Example 1 is repeated with a gas having the following composition:

| | |
|---|---|
| $H_2S = 0.42\%$ (by volume) | $H_2O = 30\%$ |
| $SO_2 = 0.21\%$ | $H_2 = 1.1\%$ |
| $COS = 0.15\%$ | $CO_2 = 1.8\%$ |
| $CS_2 = 0.04\%$ | $N_2 = 66.28\%$ |

After passage over alumina, COS and $CS_2$ cannot be detected and the gas contains 0.65% of $H_2S$ and 0.21% of $SO_2$ (0.58% $H_2S$ and 0.28% $SO_2$ after partial oxidation).

After passage through the liquid phase containing the polyethylene-glycol, the gas contains no more than 860 p.p.m. of acid gases, or 600 p.p.m. after incineration.

EXAMPLE 8

10,000 Nm.³/hour of a gas outflow from a Claus unit with the same composition, expressed by volume, as that given in example 1, are introduced into a reactor, maintained at a temperature of 130° C. and under a pressure of 1.05 atmospheres and containing a polyethylene-glycol having a mean molecular weight of 400 and 6.4 g. of potassium benzoate per kg. of solvent. Sulphur is formed and separated. The sulphur compounds content of the gas effluent from the reactor is by volume as follows:

| | |
|---|---|
| $H_2S = 0.075\%$ | $COS = 0.19\%$ |
| $SO_2 = 0.037\%$ | $CS_2 = 0.05\%$ |

This outflow, which still contains a high proportion of steam, is passed, at 300° C. and under a pressure of 1.25 absolute atmopsheres, over 10 m.³ of an alumina containing less than 0.1% by weight of $Na_2O$ and having a specific surface of 277 m.²/g. The analysis of the sulphur compounds contained in the so-treated effluent is as follows, by volume:

$H_2S = 0.355\%$; $SO_2 = 0.037\%$; $COS = 0.01\%$.

This effluent is partially oxidized, at 400° C., under a pressure of 1.15 absolute atmospheres, by addition of 750 m.³/hour of air, in the presence of alumina of a specific surface of 277 m.²/g., on which 10% by weight of $V_2O_5$ have been deposited.

By analysis it appears that the produced effluent has the following content of acid gases, by volume:

$H_2S = 0.26\%$; $SO_2 = 0.13$.

This effluent is then passed through a reaction zone in which it is contacted, at 130° C. and under a pressure of 1.05 atmospheres, with a polyethylene-glycol having a mean molecular weight of 400, and containing 6.4 g. of potassium benzoate per kg. of solvent. The effluent then contains no more than 600 p.p.m. of acid gases, which corresponds, after a conventional incineration, to about 480 p.p.m. of $SO_2$.

What we claim is:

1. In a process for purifying a gas containing $H_2S$, $SO_2$ and organic sulphur compounds, said process comprising reacting $H_2S$ and $SO_2$ in a sulphur producing reaction with an organic solvent at 20–160° C., the improvement comprising the preliminary steps of
  (a) reacting said gas and steam in a first reaction zone in the presence of a catalyst consisting essentially of alumina at 250–400° C. to convert said organic compounds substantially completely to $H_2S$ while effecting substantially no conversion of the $SO_2$ in the gas to $H_2S$, resulting in a gas having an undesirably high molar ratio of $H_2S/SO_2$, and
  (b) reacting resultant gas from step (a) with sufficient oxygen in a second reaction zone at 300–500° C., to convert a portion of the $H_2S$ in said gas to $SO_2$ and to form a gas having a desirably lower molar ratio of $H_2S/SO_2$ between 1.6 and 3.

2. A process acocrding to claim 1, wherein the gas contains from 0.01 to 4% of sulphur compounds and from 5 to 60% of steam, by volume.

3. A process according to claim 1, wherein the mixture of gas and steam contains, by volume, from 0.5 to 4% of sulphur compounds of which 0.01 to 0.3% are COS and 0.01 to 0.3% are $CS_2$, the remainder being $H_2S$ and $SO_2$ in a volumetric ratio of about 2:1 from 0.5 to 3% of hydrogen and from 10 to 40% of steam, the molar ratio of $H_2S/SO_2$ in the resultant gas from step (a) is higher than 2.4, and in which the oxygen amount in step (b) is from 0.1 to 5% of the total gas volume and is so selected that the molar ratio $H_2S/SO_2$ in the outflow from the second reaction zone be from 1.8 to 2.4.

4. A process according to claim 1, wherein the molar ratio of $H_2S/SO_2$ in the resultant gas from step (a) is above 2.2 and oxygen is introduced into the second reaction zone in such an amount that the molar ratio $H_2S/SO_2$ in the outflow from said zone be from 1.9 to 2.2.

5. A process according to claim 3, wherein the temperature in the sulphur-producing reaction zone is from 115 to 160° C.

6. A process according to claim 3, wherein in the sulphur-producing reaction zone, the organic solvent is selected among the alkylene-glycols, polyalkylene-glycols, the ethers, esters, ethers-esters of alkylene-glycols and of polyalkylene-glycols and the triesters of orthophosphoric acid.

7. A process according to claim 6, wherein in the sulphur-producing reaction zone, there is introduced in the solvent, a catalyst selected among the salts formed between metals from Groups I–A and II–A and organic carboxylic acids.

8. A process according to claim 3, wherein the treated gas is an effluent gas from a Claus unit.

9. A process acocrding to claim 3, wherein the treated gas is an effluent gas from a Claus unit after treatment by passage through a liquid phase containing an inert organic solvent.

10. A process according to Claim 3 wherein the gas to be purified is Claus-unit effluent containing on a volumetric basis, 0.1–3% $H_2S$ and $SO_2$ in a ratio of about 2:1 respectively, 0.01–0.3% COS and 0.01–3% $CS_2$.

11. A process according to Claim 1 wherein the reaction in step (b) is conducted in the presence of an oxidation catalyst.

12. A process as defined by Claim 11 wherein said oxidation catalyst comprises alumina and an oxide, in an amount of 1–20% by weight of the catalyst, of a metal selected from Group VA, VIA and VIII of the periodic classification.

13. A process as defined by Claim 12 wherein said metal is chromium, vanadium or iron.

14. A process as defined by Claim 1 wherein step (a) is conducted at 300–350° C.

15. A process as defined by Claim 14 wherein step (b) is conducted at 350–400° C.

16. A process as defined by Claim 14 wherein the amount of oxygen introduced into step (b) reacts sufficiently to result in a maximum oxygen content of 700 parts per million in the effluent from step (b).

17. A process as defined by Claim 1 wherein said alumina catalyst has an alkali metal content lower than 0.1%, a specific surface of 40–500 square meters per gram and a pore volume of from 10–80 cc./100 g.

18. A process as defined by Claim 17 wherein said alumina catalyst has a specific surface of 180–350 square meters per gram.

19. A process as defined by Claim 16 wherein said alumina catalyst has an alkali metal content lower than 0.1%, a specific surface of 40–500 square meters per gram and a pore volume of from 10–80 cc./100 g.

20. A process as defined by Claim 19 wherein said alumina catalyst has a specific surface of 180–350 square meters per gram.

References Cited

UNITED STATES PATENTS

| | | | |
|---|---|---|---|
| 3,752,877 | 8/1973 | Beavon | 423—573 X |
| 3,794,710 | 2/1974 | Merrill | 423—573 X |
| 3,441,379 | 4/1969 | Renault | 423—575 |
| 3,598,529 | 8/1971 | Deschamps et al. | 423—575 |
| 3,317,281 | 5/1967 | Grerel | 423—576 |
| 1,895,724 | 1/1933 | Miller et al. | 423—244 X |
| 1,710,141 | 1/1933 | Benner et al. | 423—244 |

FOREIGN PATENTS

| | | | |
|---|---|---|---|
| 340,016 | 12/1930 | Great Britain | 423—244 |
| 223,904 | 5/1957 | Australia | 423—244 |
| 1,329,882 | 5/1963 | France. | |
| 776,319 | 6/1957 | Great Britain. | |
| 1,138,437 | 1/1969 | Great Britain. | |

OTHER REFERENCES

Beavon et al., "Prevention of Air Pollution by Sulfur Plants," Am. Inst. Chem. Eng. Apr. 2, 1971, p. 17.

GEORGE O. PETERS, Primary Examiner

U.S. Cl. X.R.

423—576